US012634569B2

(12) United States Patent
Chen et al.

(10) Patent No.: US 12,634,569 B2
(45) Date of Patent: May 19, 2026

(54) CUBIC CAMERA AND MANUFACTURING METHOD THEREOF

(71) Applicant: PIXART IMAGING INC., Hsin-Chu (TW)

(72) Inventors: Jen-Chuan Chen, Hsin-Chu (TW); Chi-Chih Shen, Hsin-Chu (TW); Wei-Chung Wang, Hsin-Chu (TW); Yu-Chiao Peng, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 72 days.

(21) Appl. No.: 18/581,528

(22) Filed: Feb. 20, 2024

(65) Prior Publication Data

US 2025/0267349 A1     Aug. 21, 2025

(51) Int. Cl.
*H04N 23/55* (2023.01)

(52) U.S. Cl.
CPC ................................. *H04N 23/55* (2023.01)

(58) Field of Classification Search
CPC ...................................................... H04N 23/55
See application file for complete search history.

(56) References Cited

U.S. PATENT DOCUMENTS

| | | | | |
|---|---|---|---|---|
| 2002/0057468 A1* | 5/2002 | Segawa | ................... | H04N 23/54 |
| | | | | 257/E31.127 |
| 2002/0145676 A1* | 10/2002 | Kuno | ..................... | H04N 23/55 |
| | | | | 257/E31.127 |
| 2006/0028573 A1* | 2/2006 | Seo | ......................... | H04N 23/55 |
| | | | | 348/340 |

| | | | | |
|---|---|---|---|---|
| 2006/0044450 A1* | 3/2006 | Wolterink | .............. | H04N 23/55 |
| | | | | 348/340 |
| 2006/0261340 A1* | 11/2006 | Farnworth | ............ | H10F 39/804 |
| | | | | 257/E31.127 |
| 2011/0037886 A1* | 2/2011 | Singh | ..................... | H10F 39/804 |
| | | | | 348/340 |
| 2011/0096213 A1* | 4/2011 | Hasegawa | .............. | H04N 23/57 |
| | | | | 264/1.36 |
| 2016/0219203 A1* | 7/2016 | Wan | .................. | B29D 11/00807 |
| 2021/0018657 A1* | 1/2021 | Tsai | ........................ | H04N 23/55 |

FOREIGN PATENT DOCUMENTS

| | | | | | |
|---|---|---|---|---|---|
| JP | 2018042935 A | * | 3/2018 | ............. | H04N 23/55 |

OTHER PUBLICATIONS

Machine Translation of JP 2018-042935 (Year: 2018).*

* cited by examiner

*Primary Examiner* — Jason A Flohre
(74) *Attorney, Agent, or Firm* — Li & Cai Intellectual Property (USA) Office

(57) ABSTRACT

A cubic camera includes a camera lens, a sensor package component assembled to the camera lens, and a compound body. The camera lens includes a holder and a lens. The holder is opaque and has a top surface, a bottom surface, and a surrounding lateral surface that is connected to the top surface and the bottom surface. The holder has an accommodating slot recessed in the bottom surface and a thru-hole that is recessed in the top surface and that is in spatial communication with the accommodating slot. The lens is arranged in the accommodating slot. The compound body is formed on the bottom surface of the holder and covers the surrounding lateral side of the sensor package component. The compound body has an outer lateral surface having an annular shape and being flush with the surrounding lateral surface of the holder.

19 Claims, 10 Drawing Sheets

CUBIC CAMERA AND MANUFACTURING METHOD THEREOF

FIELD OF THE DISCLOSURE

The present disclosure relates to a camera, and more particularly to a cubic camera and a manufacturing method thereof.

BACKGROUND OF THE DISCLOSURE

A conventional camera manufacturing method is implemented by directly forming a plurality of package components on a wafer and then assembling lenses and housings onto the package components. However, the conventional camera manufacturing method is implemented by using the wafer to be a structural base, so that a camera manufactured by the conventional camera manufacturing method needs to have a step-like structure, and size of the camera is difficult to be further reduced.

SUMMARY OF THE DISCLOSURE

In response to the above-referenced technical inadequacies, the present disclosure provides a cubic camera and a manufacturing method thereof for effectively improving on the issues associated with conventional camera manufacturing methods.

In order to solve the above-mentioned problems, one of the technical aspects adopted by the present disclosure is to provide an manufacturing method of a cubic camera, which includes a preparing step, a placement step, an assembling step, a sealing step, and a slicing step. The preparing step is implemented by providing a holder panel that defines a plurality of holders in a matrix arrangement. Each of the holders is opaque and has an accommodating slot recessed in a bottom surface thereof. The placement step is implemented by respectively placing a plurality of lenses into the accommodating slots of the holders. Each of the holders and a corresponding one of the lenses jointly defined as one of a plurality of camera lenses. The assembling step is implemented by respectively assembling a plurality of sensor package components onto the camera lenses. Each of the sensor package components is arranged adjacent to the bottom surface of a corresponding one of the camera lenses, and each of the sensor package components includes a sensor chip, a light-permeable layer assembled to the sensor chip, and a plurality of solders that are disposed on the sensor chip and that are arranged away from the light-permeable layer. The sealing step is implemented by forming a compound layer on the holder panel that covers the bottom surface of each of the holders and a surrounding lateral side of each of the sensor package components. The solders of each of the sensor package components are exposed from the compound layer. The slicing step is implemented by cutting the holder panel and the compound layer into the holders separated from each other and a plurality compound bodies separated from each other so as to form a plurality of cubic cameras separated from each other. Each of the cubic cameras includes one of the camera lenses, a corresponding one of the sensor package components, and a corresponding one of the compound bodies.

In one of the possible or preferred embodiments, in the preparing step, each of the holders has a thru-hole that is recessed in a top surface thereof and that is in spatial communication with the accommodating slot. In the assembling step, the thru-hole of each of the holders has a central axis passing through a sensing region of the corresponding sensor package component.

In one of the possible or preferred embodiments, in the placement step, an optical curved surface of each of the lenses is arranged away from the thru-hole of the corresponding holder and is located on the central axis of the thru-hole.

In one of the possible or preferred embodiments, in the placement step, a plurality of positioning frames are respectively arranged in the accommodating slot of the holders and are respectively disposed on the lenses, such that each of the camera lenses further includes a corresponding one of the positioning frames. In the assembling step, each of the camera lenses is connected to the corresponding sensor package component through the positioning frame thereof.

In one of the possible or preferred embodiments, the lens and the positioning frame of each of the camera lenses are connected to be a single one-piece structure. In the placement step, each of the lenses and a corresponding one of the positioning frames are synchronously disposed in the accommodating slot of the corresponding holder.

In one of the possible or preferred embodiments, in the placement step, an end portion of each of the positioning frames protrudes from the corresponding accommodating slot. In the assembling step, each of the camera lenses is connected to the corresponding sensor package component through the end portion of the positioning frame thereof.

In one of the possible or preferred embodiments, in the assembling step, the bottom surface of each of the holders is spaced apart from the corresponding sensor package component by an annular gap that is less than or equal to 60 μm.

In one of the possible or preferred embodiments, the end portion of each of the positioning frames has an annular shape. In the assembling step, the end portion of each of the camera lenses and the corresponding sensor package component are connected to each other through one of a plurality of annular adhesive layers.

In one of the possible or preferred embodiments, in the assembling step, the end portion of each of the camera lenses and the corresponding sensor package component have a slit therebetween that is arranged outside of the annular adhesive layer. In the sealing step, the compound layer is filled into the slit corresponding to each of the camera lenses and does not flow through each of the annular adhesive layers.

In one of the possible or preferred embodiments, an outer surface of each of the sensor package components includes the surrounding lateral side, a first surface arranged on the light-permeable layer, and a second surface that is arranged on the sensor chip and that is opposite to the first surface, the solders are disposed on the second surface, and the surrounding lateral side is connected in-between the first surface and the second surface. In the assembling step, each of the camera lenses is connected to the first surface of the corresponding sensor package component. In the sealing step, the solders and the second surface of each of the sensor package component are exposed from the compound layer.

In one of the possible or preferred embodiments, each of the sensor package components includes a sensing region that is arranged between the first surface and the second surface and that is surrounded inside of the surrounding lateral side.

In order to solve the above-mentioned problems, another one of the technical aspects adopted by the present disclosure is to provide a cubic camera, which includes a camera lens, a sensor package component, and a compound body. The camera lens includes a holder and a lens. The holder is opaque and has a top surface, a bottom surface that is opposite to the top surface, and a surrounding lateral surface that is connected in-between the top surface and the bottom surface. The holder has an accommodating slot recessed in the bottom surface and a thru-hole that is recessed in the top surface and that is in spatial communication with the accommodating slot. The lens is arranged in the accommodating slot. The sensor package component includes a sensor chip, a light-permeable layer assembled to the sensor chip, and a plurality of solders. Moreover, an outer surface of the sensor package component has a first surface arranged on the light-permeable layer, a second surface arranged on the sensor chip and being opposite to the first surface, a surrounding lateral side that is connected in-between the first surface and the second surface. The solders are disposed on the second surface of the sensor chip. The sensor package component is assembled to the camera lens through the first surface. The compound body is formed on the bottom surface of the holder and covers the surrounding lateral side of the sensor package component. The solders and the second surface of the sensor package component are exposed from the compound body, and the compound body has an outer lateral surface having an annular shape and being flush with the surrounding lateral surface of the holder.

In one of the possible or preferred embodiments, the sensor package component includes a sensing region that is arranged between the first surface and the second surface and that is surrounded inside of the surrounding lateral side. Moreover, a central axis of the thru-hole of the holder is arranged by passing through the sensing region.

In one of the possible or preferred embodiments, the bottom surface of the holder is spaced apart from the first surface of the sensor package component by an annular gap that is less than or equal to 60 µm and that is fully filled with the compound body.

In one of the possible or preferred embodiments, the camera lens includes a positioning frame arranged in the accommodating slot and disposed on the lens, and an end portion of the positioning frame protrudes from the accommodating slot. The camera lens is connected to the first surface of the sensor package component through the end portion of the positioning frame so as to form the annular gap.

In one of the possible or preferred embodiments, the lens and the positioning frame are connected to be a single one-piece structure.

In one of the possible or preferred embodiments, the end portion of the positioning frame has an annular shape, the camera lens includes an annular adhesive layer that connects the end portion and the first surface, and the compound body does not pass through the annular adhesive layer.

In one of the possible or preferred embodiments, the end portion of the camera lens and the first surface of the sensor package component have a slit therebetween that is arranged outside of the annular adhesive layer. The slit is in spatial communication with the annular gap and is fully filled with the compound body.

In one of the possible or preferred embodiments, the lens has an optical curved surface that is arranged away from the thru-hole and that faces toward the first surface. The optical curved surface is arranged on a central axis of the thru-hole.

In one of the possible or preferred embodiments, the camera lens and the sensor package component jointly define an enclosed space that is filled with air.

Therefore, the cubic camera and the manufacturing method thereof in the present disclosure are provided by using the holders or the holder panel to be a structural base, so that the sensor package components can be manufactured in advance, and the sensor package component having a defective function can be prevented from being applied in the cubic camera or the manufacturing method, thereby increasing a yield rate of the cubic cameras. Moreover, the holders or the holder panel is used as a structural base for the cubic camera and the manufacturing method, so that each of the cubic cameras can be allowed to be formed in a smaller size.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
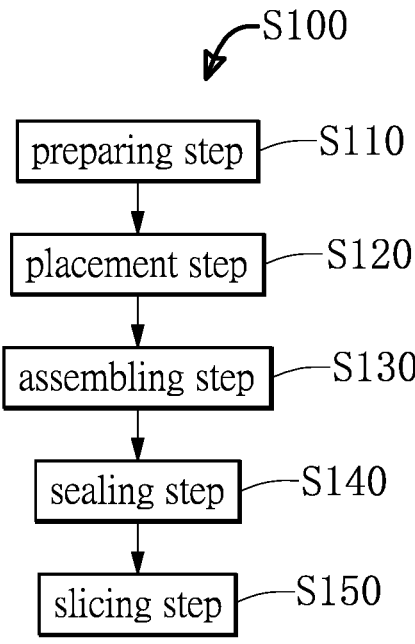
FIG. 1 is a flow chart of a manufacturing method of a cubic camera according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 10, an embodiment of the present disclosure is provided. As shown in FIG. 1, the present embodiment provides a manufacturing method S100 of a cubic camera, which sequentially includes or implements a preparing step S110, a placement step S120, an assembling step S130, a sealing step S140, and a slicing step S150.

The following description sequentially describes the steps S110-S150 of the manufacturing method S100 that can be implemented to manufacture a plurality of cubic cameras 100 (shown in FIG. 8), but the present disclosure is not limited thereto. For example, in other embodiments of the present disclosure not shown in the drawings, the steps S110-S150 of the manufacturing method S100 can be adjusted (e.g., canceled or added) according to design requirements.

Figure 2:
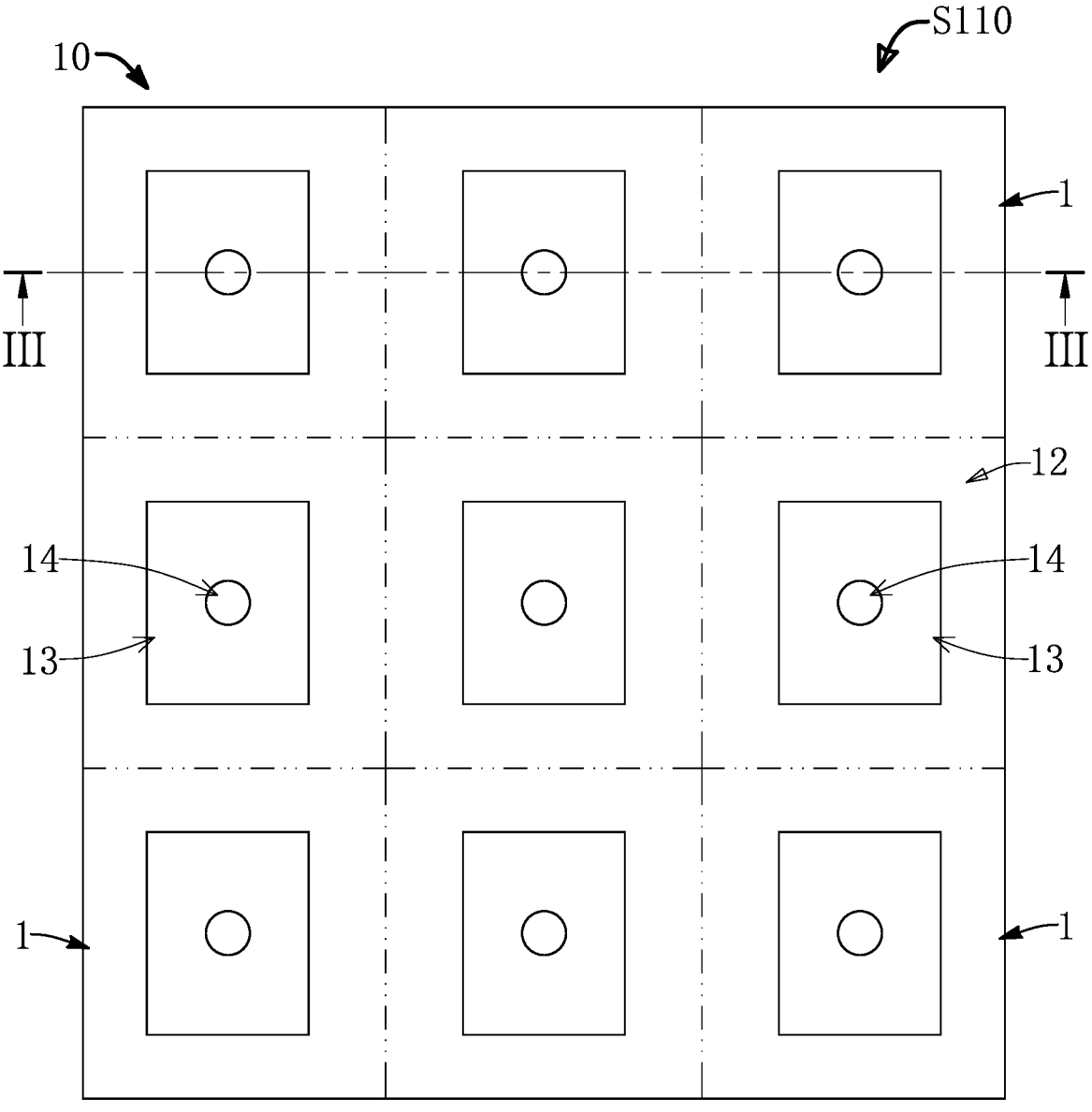
FIG. 2 is a schematic view showing a preparing step of the manufacturing method of FIG. 1.
Figure 3:
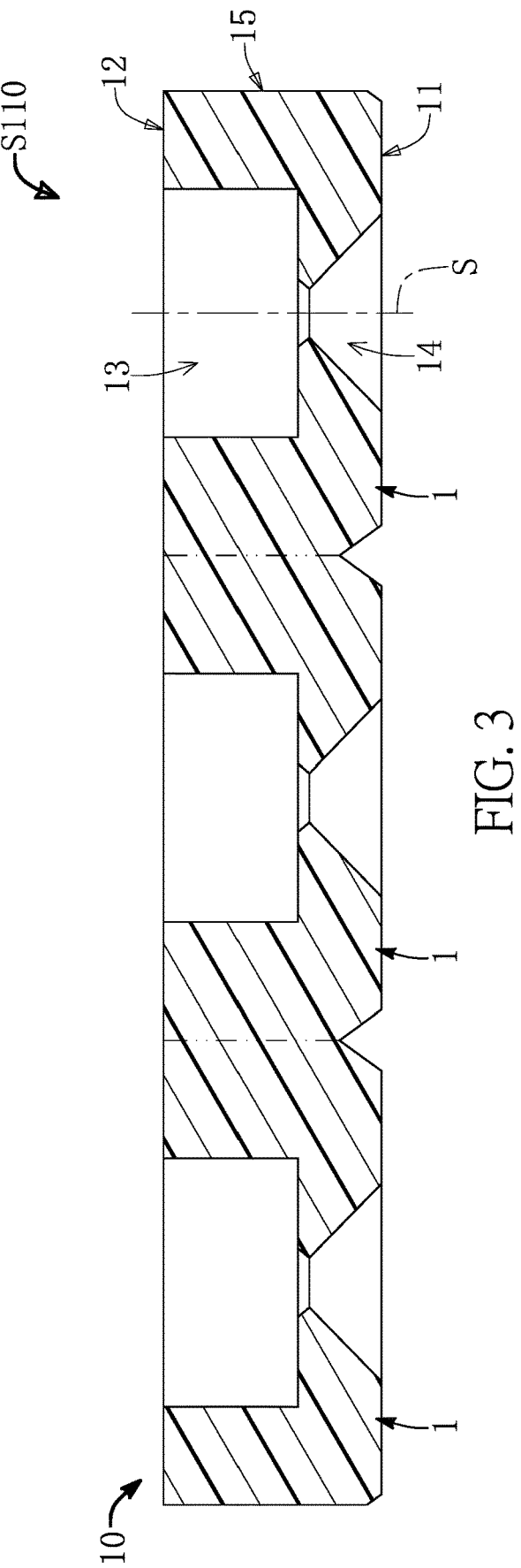
FIG. 3 is a schematic cross-sectional view taken along line III-III of FIG. 2.

As shown in FIG. 1 to FIG. 3, the preparing step S110 is implemented by providing a holder panel 10 that defines a plurality of holders 1 in a matrix arrangement. Each of the holders 1 is opaque and has an accommodating slot 13 recessed in a bottom surface thereof, and each of the holders 1 has a thru-hole 14 that is recessed in a top surface 11 thereof and that is in spatial communication with the accommodating slot 13. In the present embodiment, the thru-hole 14 of each of the holders 1 substantially has a conical shape and has a cross section that is gradually tapered (or smaller) in a direction away from the top surface 11.

Figure 4:
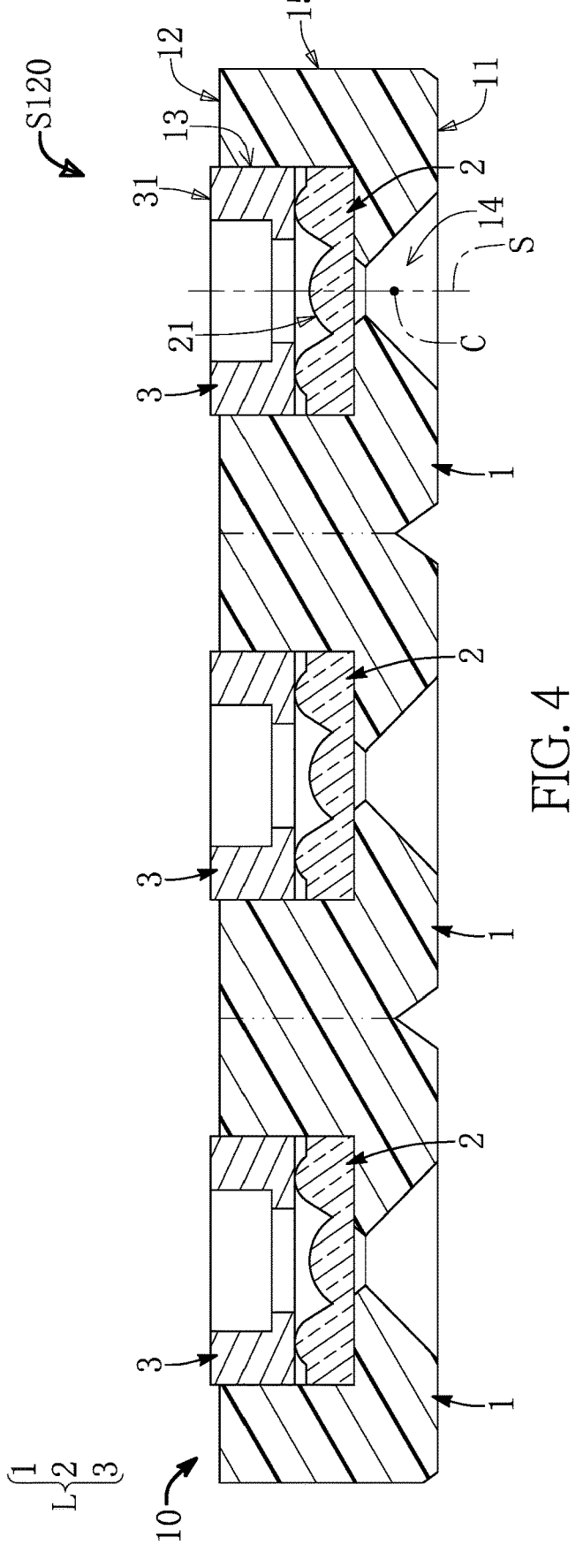
FIG. 4 is a schematic cross-sectional view showing a placement step of the manufacturing method of FIG. 1.
Figure 5:
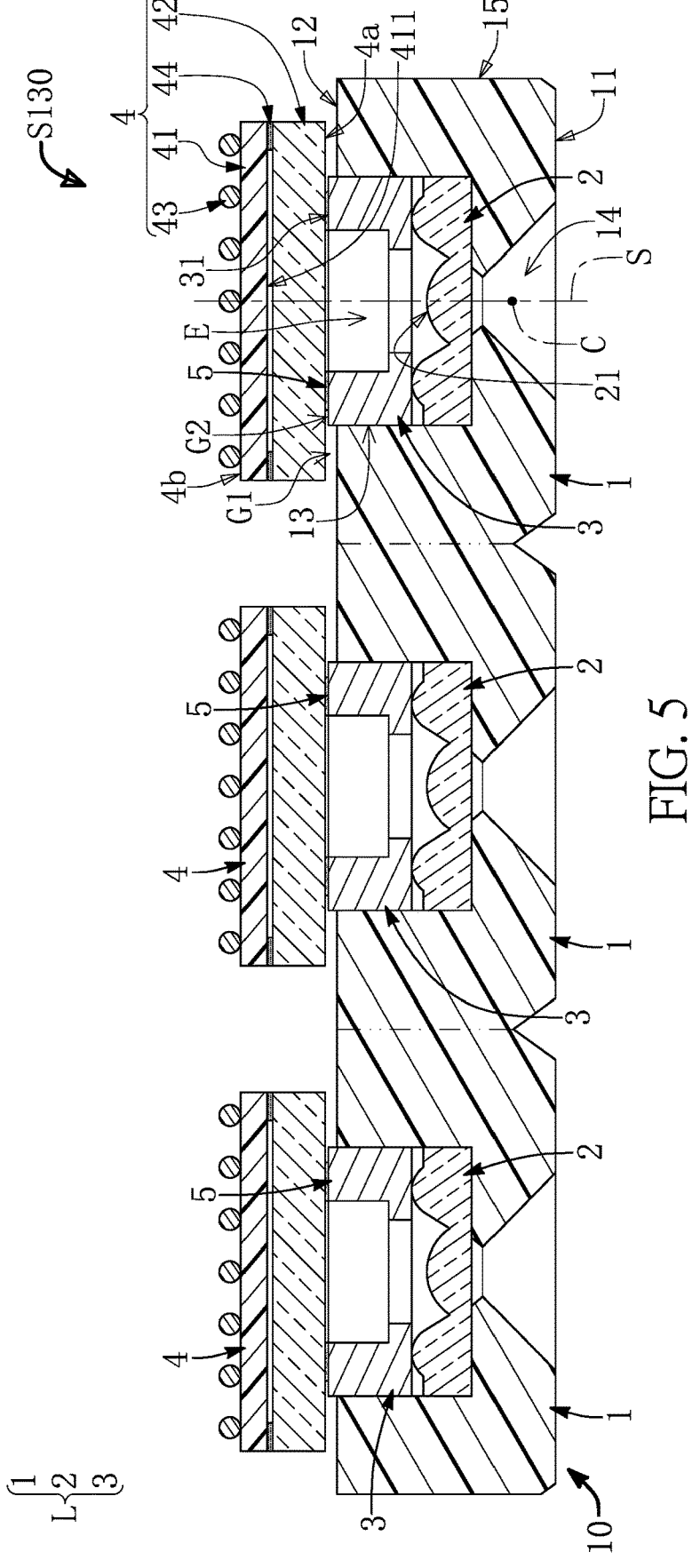
FIG. 5 is a schematic cross-sectional view showing an assembling step of the manufacturing method of FIG. 1.

Moreover, as shown in FIG. 4 and FIG. 5, the preparing step 110 in the present embodiment can be implemented by further providing a plurality of lenses 2, a plurality of positioning frames 3 respectively disposed on the lenses 2, and a plurality of sensor package components 4. In the present embodiment, each of the lenses 2 and a corresponding one of the positioning frames 3 are connected to each other so as to be a single one-piece structure that has a height slightly greater than a depth of any one of the accommodating slots 13, but the present disclosure is not limited thereto.

Moreover, each of the sensor package components 4 includes a sensor chip 41, a light-permeable layer 42 assembled to the sensor chip 41, and a plurality of solders 43 (e.g., solder balls) that are disposed on the sensor chip 41 and that are arranged away from the light-permeable layer 42. In each of the sensor package components 4, an upper surface of the sensor chip 41 has a sensing region 411, the light-permeable layer 42 is adhered onto the upper surface of the sensor chip 41 and surrounds at an outer side of the sensing region 411 for being spaced apart from the sensing region 411, and the solders 43 are fixed to a lower surface of the sensor chip 41 and are spaced apart from each other. In the present embodiment, the light-permeable layer 42 is adhered onto the sensor chip 41 through a connection layer 44 so as to jointly form an enclosed space. The sensing region 411 is arranged in the enclosed space.

In other words, an outer surface of each of the sensor package components 4 includes a first surface 4a arranged on the light-permeable layer 42, a second surface 4b that is arranged on the sensor chip 41 and that is opposite to the first surface 4a, and a surrounding lateral side 4c that is connected in-between the first surface 4a and the second surface 4b. Specifically, the lower surface of the sensor chip 41 is defined as the second surface 4b, the solders 43 are disposed on the second surface 4b, and the sensing region 411 is arranged between the first surface 4a and the second surface 4b and is surrounded inside of the surrounding lateral side 4c.

As shown in FIG. 1 and FIG. 4, the placement step S120 is implemented by respectively placing the lenses 2 into the accommodating slots 13 of the holders 1 and by respectively placing the positioning frames 3 on the lenses 2, but the present disclosure is not limited thereto. Specifically, each of the holders 1, a corresponding one of the lenses 2, and a corresponding one of the positioning frames 3 are jointly defined as one of a plurality of camera lenses L. However, in other embodiments of the present disclosure not shown in the drawings, the accommodating slot 13 of each of the holders 1 can be provided to receive one of the lenses 2 therein, but does not allow any one of the positioning frames 3 to be arranged therein. In other words, the lens 2 can be positioned in the accommodating slot 13 in other manners without the positioning frames 3, and each of the holders 1 and a corresponding one of the lenses 2 arranged therein can be jointly defined as one of the camera lenses L.

In each of the camera lenses L of the present embodiment, the lens 2 is preferably disposed onto a bottom of the accommodating slot 13 in a direction from an upper side to a lower side, the positioning frame 3 is disposed on a peripheral portion of the lens 2, and the lens 2 and the positioning frame 3 are adhered to an inner wall of the accommodating slot 13. Moreover, the accommodating slot 13 of each of the holders 1 in the present embodiment is synchronously assembled with the lens 2 and the corresponding positioning frame 3 by connecting the lens 2 and the corresponding positioning frame 3 to be a single one-piece structure in advance, but the present disclosure is not limited thereto.

Specifically, each of the lenses 2 has an optical curved surface 21 that is arranged away from the thru-hole 14 of the corresponding holder 1 and that is arranged on a central axis S of the thru-hole 14. The optical curved surface 21 in the present embodiment has a center of curvature C that is substantially arranged in the thru-hole 14. The peripheral portion of the lens 2 carrying the positioning frame 31 is arranged outside of the optical curved surface 21. Moreover, an end portion 31 of each of the positioning frames 3 protrudes from the corresponding accommodating slot 13. In other words, each of the end portions 31 has an annular shape and protrudes from the bottom surface 12 of the corresponding holder 1 by a distance that is less than or equal to 5 μm.

As shown in FIG. 1 and FIG. 5, the assembling step S130 is implemented by respectively assembling the sensor package components 4 onto the camera lenses L. Each of the sensor package components 4 is arranged adjacent to the bottom surface 12 of the holder 1 of a corresponding one of the camera lenses L. Each of the camera lenses L is connected to the corresponding sensor package component 4 (e.g., the first surface 4a) through the positioning frame 3 (e.g., the end portion 31) thereof. In other words, the bottom surface 12 of each of the holders 1 is spaced apart from the corresponding sensor package component 4 (e.g., the first surface 4a) by an annular gap G1 that is less than or equal to 60 μm.

Specifically, the end portion 31 of each of the camera lenses L and the corresponding sensor package component 4 in the present embodiment are connected to each other through one of a plurality of annular adhesive layers 5, and the end portion 31 of each of the camera lenses L and the corresponding sensor package component 4 have a slit G2 therebetween that is arranged outside of the annular adhesive layer 5 and that is in spatial communication with the annular gap G1. Moreover, the central axis S of the thru-hole 14 of each of the holders 1 is arranged by perpendicularly passing through the sensing region 411 of the corresponding sensor package component 4.

It should be noted that the components described in the preparing step S110 can be prepared or provided before a corresponding step is implemented. For example, the sensor package components 4 can be provided at a time between the implementation of the placement step S120 and the implementation of the assembling step S130.

Figure 6:
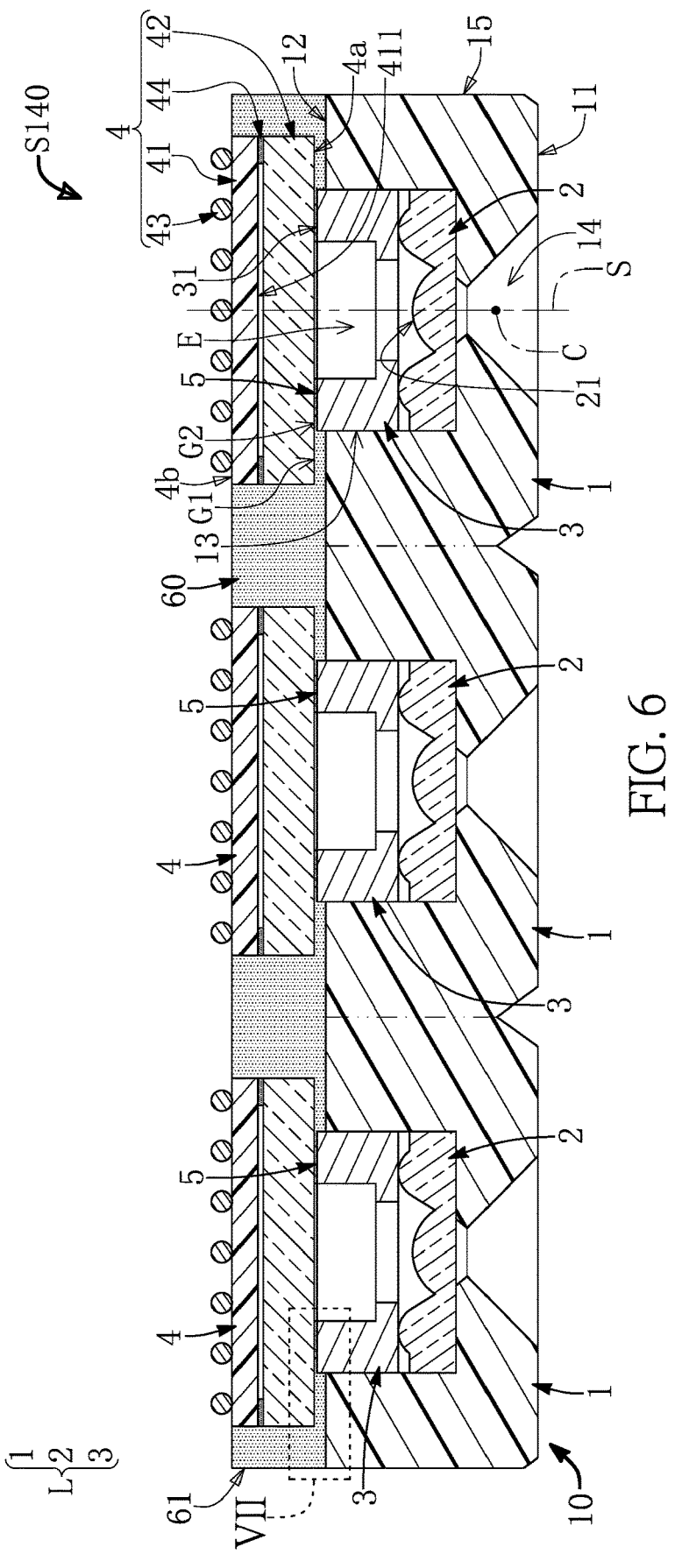
FIG. 6 is a schematic cross-sectional view showing a sealing step of the manufacturing method of FIG. 1.
Figure 7:
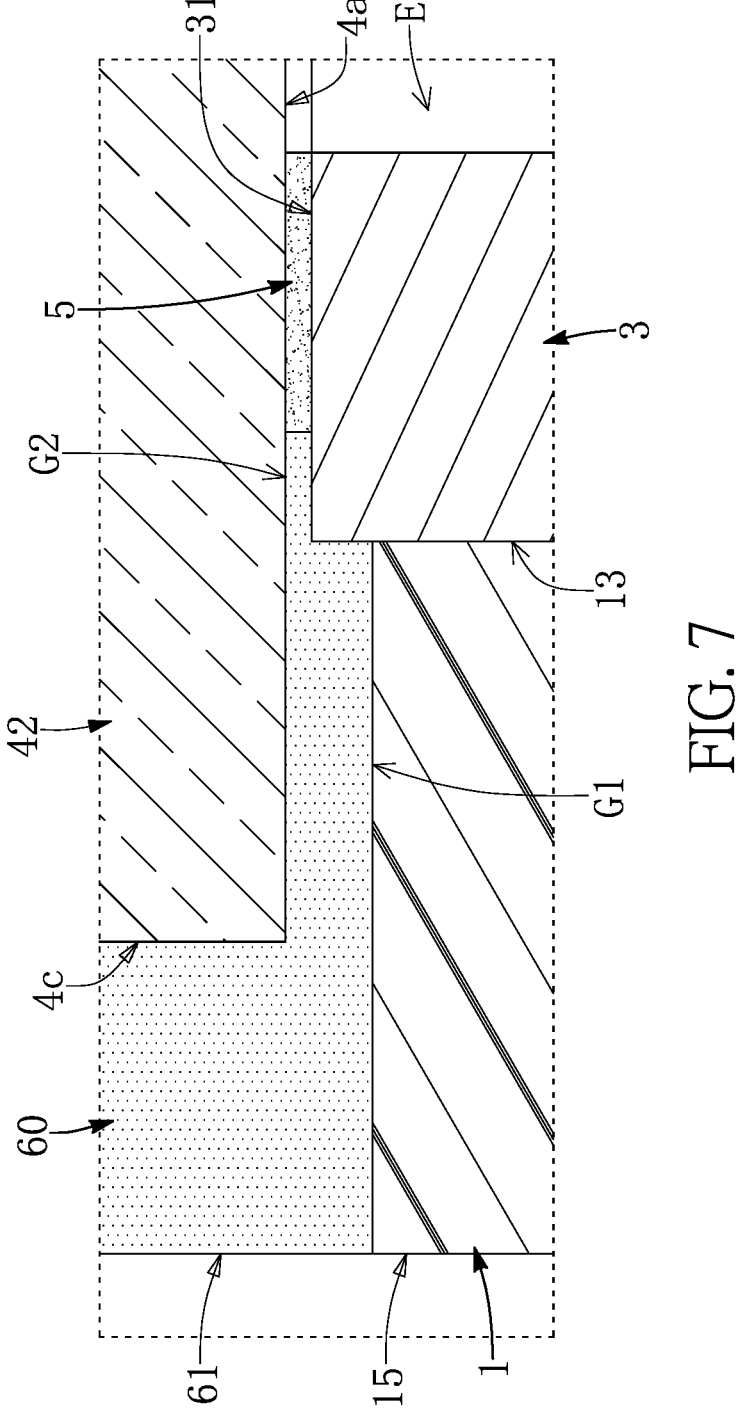
FIG. 7 is a schematic enlarged view of part VII of FIG. 6.

As shown in FIG. 1, FIG. 6, and FIG. 7, the sealing step S140 is implemented by forming a compound layer 60 on the holder panel 10 that covers the bottom surface 12 of each of the holders 1 and the surrounding lateral side 4c of each of the sensor package components 4. Specifically, the compound layer 60 is opaque, and the compound layer 60 is filled into the annular gaps G1 and the slits G2 corresponding to the camera lenses L and does not flow through each of the annular adhesive layers 5. Moreover, the second surface 4b and the solders 43 of each of the sensor package components 4 are exposed from the compound layer 60.

Figure 8:
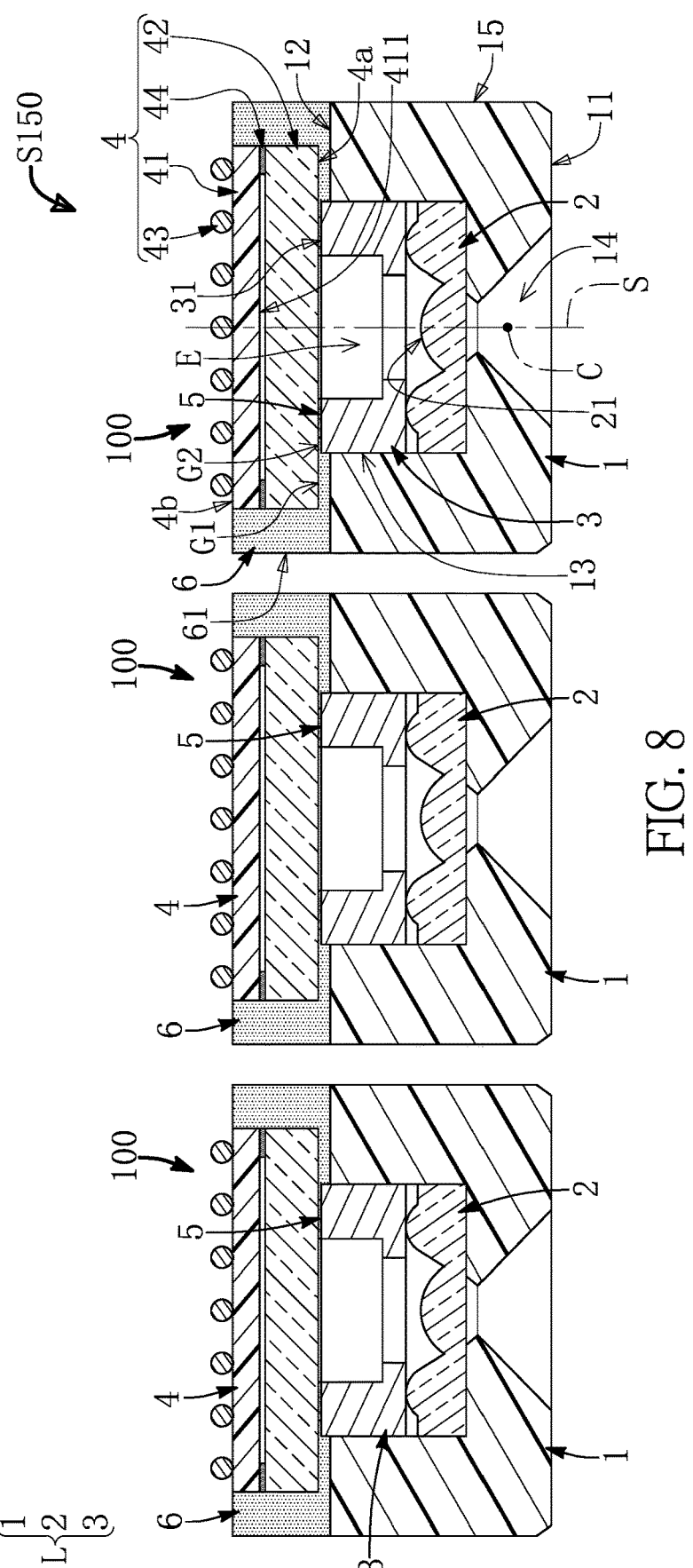
FIG. 8 is a schematic cross-sectional view showing a slicing step of the manufacturing method of FIG. 1.

As shown in FIG. 1 and FIG. 8, the slicing step S150 is implemented by cutting the holder panel 10 and the compound layer 60 into the holders 1 separated from each other and a plurality compound bodies 6 separated from each other, so as to form the cubic cameras 100 separated from each other. Specifically, each of the cubic cameras 100 includes one of the camera lenses L, a corresponding one of the sensor package components 4, and a corresponding one of the compound bodies 6.

It should be noted that the cubic cameras 100 in the present embodiment have a same structure, but the present disclosure is not limited thereto. For example, in other embodiments of the present disclosure not shown in the drawings, the cubic cameras 100 can be provided with different components according to design requirements (e.g., the sensor package components 4 respectively arranged in the cubic cameras 100 can have at least two different sensing functions).

In summary, the manufacturing method S100 in the present embodiment is implemented by using the holders 1 or the holder panel 10 to be a structural base, so that the sensor package components 4 can be manufactured in advance, and the sensor package component 4 having a defective function can be prevented from being applied in the manufacturing method S100, thereby increasing a yield rate of the cubic cameras 100 manufactured by implementing the manufacturing method S100. Moreover, the manufacturing method S100 is implemented by using the holders 1 or the holder panel 10 to be a structural base, so that each of the cubic cameras 100 can be allowed to be formed in a smaller size.

In addition, the manufacturing method S100 provided by the present embodiment is described in the above description, and the following description approximately describes the cubic camera 100 manufactured by implementing the manufacturing method S100. Accordingly, the features of the cubic camera 100 can be referred to the above description tion corresponding to the manufacturing method S100, but the present disclosure is not limited thereto.

Figure 9:
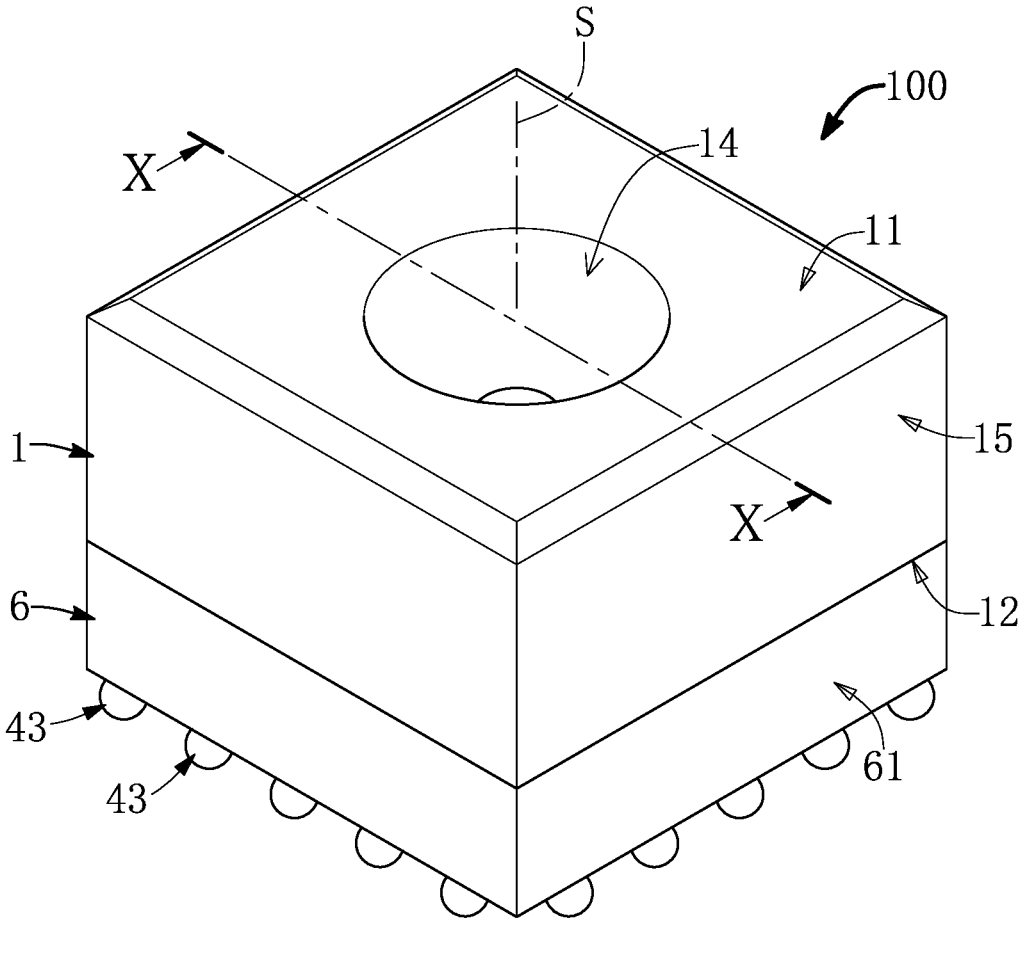
FIG. 9 is a schematic perspective view of the cubic camera according to the embodiment of the present disclosure.
Figure 10:
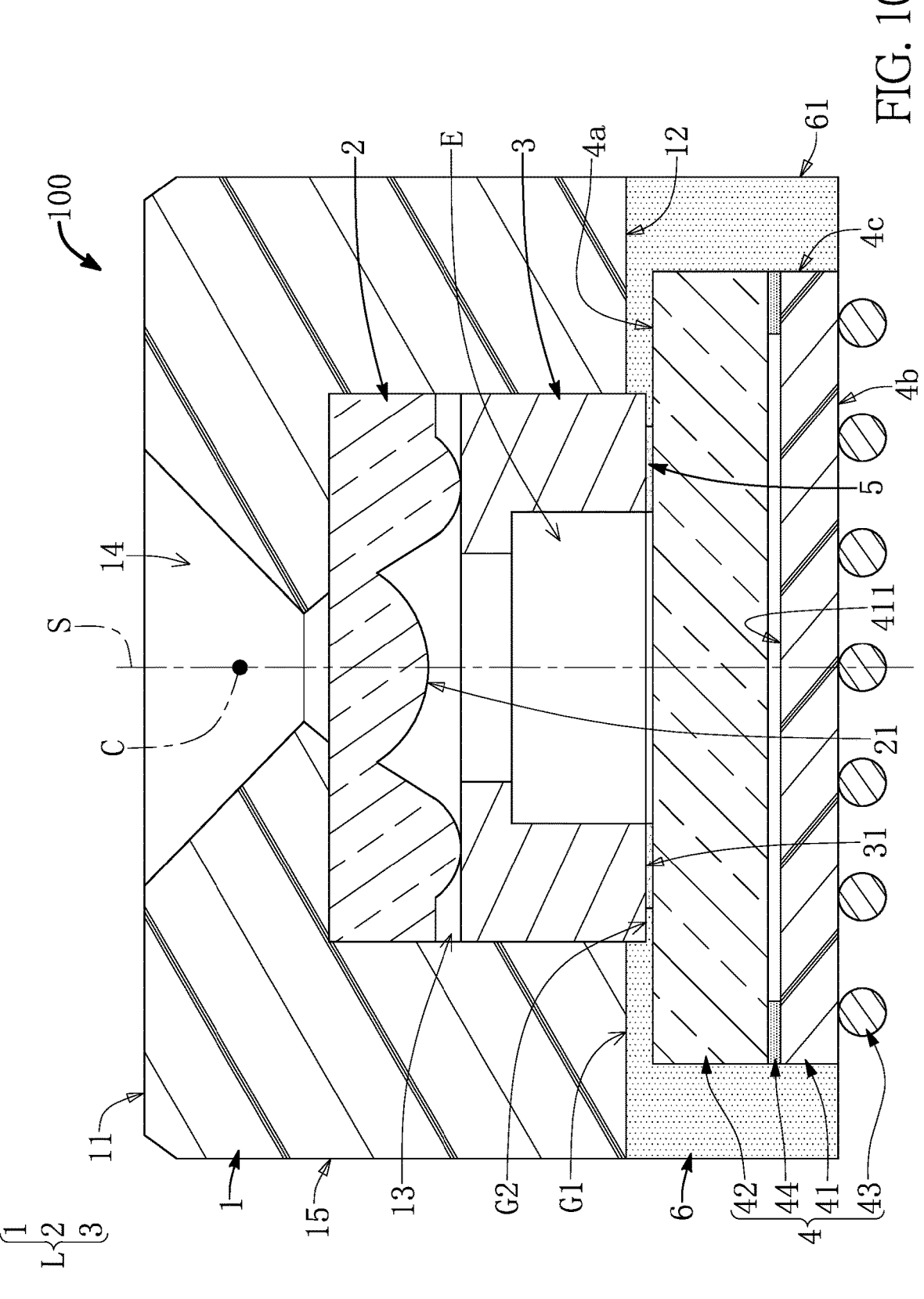
FIG. 10 is a schematic cross-sectional view taken along line X-X of FIG. 9.

As shown in FIG. 9 and FIG. 10, the cubic camera 100 in the present embodiment includes a camera lens L, a sensor package component 4 assembled to the camera lens L, and a compound body 6 that is connected to the camera lens L and the sensor package component 4. The camera lens L includes a holder 1, a lens 2, and a positioning frame 3. The lens 2 and the positioning frame 3 are assembled in the holder 1, and the lens 2 and the positioning frame 3 in the present embodiment are connected to each other so as to be a single one-piece structure, but the present disclosure is not limited thereto.

Specifically, the holder 1 is opaque and has a top surface 11, a bottom surface 12 opposite to the top surface 11, and a surrounding lateral surface 13 that is connected in-between the top surface 11 and the bottom surface 12. The holder 1 has an accommodating slot 13 recessed in the bottom surface 12 and a thru-hole 14 that is recessed in the top surface 11 and that is in spatial communication with accommodating slot 13.

Moreover, the lens 2 is disposed in the accommodating slot 13 and shields one side of the thru-hole 14, the positioning frame 3 is disposed in the accommodating slot 13 and is disposed on the lens 2, and an end portion 31 of the positioning frame 3 has an annular shape and protrudes from the accommodating slot 13.

The sensor package component 4 includes a sensor chip 41, a light-permeable layer 42 assembled to an upper surface of the sensor chip 41, and a plurality of solders 43 that are disposed on a lower surface of the sensor chip 41. In the present embodiment, the light-permeable layer 42 is adhered onto the upper surface of the sensor chip 41 and surrounds at an outer side of a sensing region 411 of the sensor chip 41 for being spaced apart from the sensing region 411, and the solders 43 are fixed to the lower surface of the sensor chip 41 and are spaced apart from each other.

In other words, an outer surface of the sensor package component 4 includes a first surface 4a arranged on the light-permeable layer 42, a second surface 4b that is arranged on the sensor chip 41 and that is opposite to the first surface 4a, and a surrounding lateral side 4c that is connected in-between the first surface 4a and the second surface 4b. Specifically, the sensing region 411 is arranged between the first surface 4a and the second surface 4b and is surrounded inside of the surrounding lateral side 4c.

Moreover, the lower surface of the sensor chip 41 is defined as the second surface 4b, the solders 43 are disposed on the second surface 4b of the sensor chip 41, and the sensor package component 4 is assembled to the camera lens L through the first surface 4a. The camera lens L is connected to the first surface 4a of the sensor package component 4 through the end portion 31 of the positioning frame 3, so as to jointly form an annular gap G1. In the present embodiment, the bottom surface 12 of the holder 1 is spaced apart from the first surface 4a of the sensor package component 4 by the annular gap G1 that is less than or equal to 60 μm.

Specifically, the camera lens L in the present embodiment further includes an annular adhesive layer 5 that connects the end portion 31 and the first surface 4a of the sensor package component 4, and the end portion 31 and the first surface 4a have a slit G2 therebetween that is arranged outside of the annular adhesive layer 5 and that is in spatial communication with the annular gap G1, but the present disclosure is not limited thereto. For example, in other embodiments of the present disclosure not shown in the drawings, the cubic camera 100 can be formed without at least one of the annular gap G1 and the slit S2 according to design requirements.

In addition, the camera lens L and the sensor package component 4 jointly define an enclosed space E that is filled with air. Moreover, the lens 2 has an optical curved surface 21 that is arranged away from the thru-hole 14 and that faces toward the first surface 4*a*. The optical curved surface 21 and the sensing region 411 are arranged on a central axis S of the thru-hole 14, and a center of curvature C of the optical curved surface 21 is substantially arranged in the thru-hole 14 and is located at the central axis S, but the present disclosure is not limited thereto.

The compound body 6 is formed on the bottom surface 12 of the holder 1 and covers the surrounding lateral side 4*c* of the sensor package component 4, and the solders 43 and the second surface 4*b* of the sensor package component 4 are exposed from the compound body 6. The annular gap G1 and the slit G2 are fully filled with the compound body 6, and the compound body 6 does not pass through the annular adhesive layer 5, so that the holder 1, the positioning frame 3, and the sensor package component 4 can be firmly connected to each other through the compound body 6. Moreover, the compound body 6 has an outer lateral surface 61 having an annular shape and being flush with and coplanar with the surrounding lateral surface 15 of the holder 1.

Beneficial Effects of the Embodiments

In conclusion, the cubic camera and the manufacturing method thereof in the present disclosure are provided by using the holders or the holder panel to be a structural base, so that the sensor package components can be manufactured in advance, and the sensor package component having a defective function can be prevented from being applied in the cubic camera or the manufacturing method, thereby increasing a yield rate of the cubic cameras. Moreover, the holders or the holder panel is used as a structural base for the cubic camera and the manufacturing method, so that each of the cubic cameras can be allowed to be formed in a smaller size.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A manufacturing method of a cubic camera, comprising:

a preparing step implemented by providing a holder panel that defines a plurality of holders in a matrix arrangement, wherein each of the holders is opaque and has an accommodating slot recessed in a bottom surface thereof;

a placement step implemented by respectively placing a plurality of lenses into the accommodating slots of the holders, wherein each of the holders and a corresponding one of the lenses jointly defined as one of a plurality of camera lenses;

an assembling step implemented by respectively assembling a plurality of sensor package components onto the camera lenses, wherein each of the sensor package components is arranged adjacent to the bottom surface of a corresponding one of the camera lenses, and each of the sensor package components includes a sensor chip, a light-permeable layer assembled to the sensor chip, and a plurality of solders that are disposed on the sensor chip and that are arranged away from the light-permeable layer;

a sealing step implemented by forming a compound layer on the holder panel that covers the bottom surface of each of the holders and a surrounding lateral side of each of the sensor package components, wherein the solders of each of the sensor package components are exposed from the compound layer; and a slicing step implemented by cutting the holder panel and the compound layer into the holders separated from each other and a plurality compound bodies separated from each other so as to form a plurality of cubic cameras separated from each other, wherein each of the cubic cameras includes one of the camera lenses, a corresponding one of the sensor package components, and a corresponding one of the compound bodies.

2. The manufacturing method according to claim 1, wherein, in the preparing step, each of the holders has a thru-hole that is recessed in a top surface thereof and that is in spatial communication with the accommodating slot, and wherein, in the assembling step, the thru-hole of each of the holders has a central axis passing through a sensing region of the corresponding sensor package component.

3. The manufacturing method according to claim 2, wherein, in the placement step, an optical curved surface of each of the lenses is arranged away from the thru-hole of the corresponding holder and is located on the central axis of the thru-hole.

4. The manufacturing method according to claim 1, wherein, in the placement step, a plurality of positioning frames are respectively arranged in the accommodating slot of the holders and are respectively disposed on the lenses, such that each of the camera lenses further includes a corresponding one of the positioning frames, and wherein, in the assembling step, each of the camera lenses is connected to the corresponding sensor package component through the positioning frame thereof.

5. The manufacturing method according to claim 4, wherein the lens and the positioning frame of each of the camera lenses are connected to be a single one-piece structure, and wherein, in the placement step, each of the lenses and a corresponding one of the positioning frames are synchronously disposed in the accommodating slot of the corresponding holder.

6. The manufacturing method according to claim 4, wherein, in the placement step, an end portion of each of the positioning frames protrudes from the corresponding accommodating slot, and wherein, in the assembling step, each of the camera lenses is connected to the corresponding sensor package component through the end portion of the positioning frame thereof.

7. The manufacturing method according to claim 6, wherein, in the assembling step, the bottom surface of each of the holders is spaced apart from the corresponding sensor package component by an annular gap that is less than or equal to 60 μm.

8. The manufacturing method according to claim 6, wherein the end portion of each of the positioning frames has an annular shape, and wherein, in the assembling step, the end portion of each of the camera lenses and the corresponding sensor package component are connected to each other through one of a plurality of annular adhesive layers.

9. The manufacturing method according to claim 8, wherein, in the assembling step, the end portion of each of the camera lenses and the corresponding sensor package component have a slit therebetween that is arranged outside of the annular adhesive layer, and wherein, in the sealing step, the compound layer is filled into the slit corresponding to each of the camera lenses and does not flow through each of the annular adhesive layers.

10. The manufacturing method according to claim 1, wherein an outer surface of each of the sensor package components includes the surrounding lateral side, a first surface arranged on the light-permeable layer, and a second surface that is arranged on the sensor chip and that is opposite to the first surface, the solders are disposed on the second surface, and the surrounding lateral side is connected in-between the first surface and the second surface, wherein, in the assembling step, each of the camera lenses is connected to the first surface of the corresponding sensor package component, and wherein, in the sealing step, the solders and the second surface of each of the sensor package component are exposed from the compound layer.

11. The manufacturing method according to claim 10, wherein each of the sensor package components includes a sensing region that is arranged between the first surface and the second surface and that is surrounded inside of the surrounding lateral side.

12. A cubic camera, comprising:
a camera lens including:
    a holder being opaque and having a top surface, a bottom surface that is opposite to the top surface, and a surrounding lateral surface that is connected in-between the top surface and the bottom surface, wherein the holder has an accommodating slot recessed in the bottom surface and a thru-hole that is recessed in the top surface and that is in spatial communication with the accommodating slot; and
    a lens arranged in the accommodating slot;
a sensor package component including:
    a sensor chip;
    a light-permeable layer assembled to the sensor chip, wherein an outer surface of the sensor package component has a first surface arranged on the light-permeable layer, a second surface arranged on the sensor chip and being opposite to the first surface, a surrounding lateral side that is connected in-between the first surface and the second surface; and a plurality of solders disposed on the second surface of the sensor chip;
wherein the sensor package component is assembled to the camera lens through the first surface; and
a compound body formed on the bottom surface of the holder and covering the surrounding lateral side of the sensor package component, wherein the solders and the second surface of the sensor package component are exposed from the compound body, and the compound body has an outer lateral surface having an annular shape and being flush with the surrounding lateral surface of the holder;
wherein the bottom surface of the holder is spaced apart from the first surface of the sensor package component by an annular gap that is less than or equal to 60 μm and that is fully filled with the compound body.

13. The cubic camera according to claim 12, wherein the sensor package component includes a sensing region that is arranged between the first surface and the second surface and that is surrounded inside of the surrounding lateral side, and wherein a central axis of the thru-hole of the holder is arranged by passing through the sensing region.

14. The cubic camera according to claim 12, wherein the camera lens includes a positioning frame arranged in the accommodating slot and disposed on the lens, and an end portion of the positioning frame protrudes from the accommodating slot, and wherein the camera lens is connected to the first surface of the sensor package component through the end portion of the positioning frame so as to form the annular gap.

15. The cubic camera according to claim 14, wherein the lens and the positioning frame are connected to be a single one-piece structure.

16. The cubic camera according to claim 14, wherein the end portion of the positioning frame has an annular shape, the camera lens includes an annular adhesive layer that connects the end portion and the first surface, and the compound body does not pass through the annular adhesive layer.

17. The cubic camera according to claim 16, wherein the end portion of the camera lens and the first surface of the sensor package component have a slit therebetween that is arranged outside of the annular adhesive layer, and wherein the slit is in spatial communication with the annular gap and is fully filled with the compound body.

18. The cubic camera according to claim 12, wherein the lens has an optical curved surface that is arranged away from the thru-hole and that faces toward the first surface, and wherein the optical curved surface is arranged on a central axis of the thru-hole.

19. The cubic camera according to claim 12, wherein the camera lens and the sensor package component jointly define an enclosed space that is filled with air.

* * * * *